US00RE37862E

(19) United States
(12) Reissued Patent
Hertz et al.

(10) Patent Number: US RE37,862 E
(45) Date of Reissued Patent: Oct. 1, 2002

(54) METHOD AND APPARATUS FOR HIGH RESOLUTION INK JET PRINTING

(75) Inventors: Carl H. Hertz, deceased, late of Lund (SE), by Ulf Alfredsson, legal representative; Bo A. Samuelsson, Lund (SE)

(73) Assignees: Thomas G. Hertz (SE); Hans Martin Hertz (SE)

(21) Appl. No.: 08/516,524

(22) Filed: Aug. 17, 1995

Related U.S. Patent Documents

Reissue of:
(64) Patent No.: 4,620,196
Issued: Oct. 28, 1986
Appl. No.: 06/696,690
Filed: Jan. 31, 1985

U.S. Applications:

(63) Continuation of application No. 08/117,333, filed on Sep. 3, 1993, now abandoned, which is a continuation of application No. 07/564,696, filed on Aug. 7, 1990, now abandoned, which is a continuation of application No. 07/262,916, filed on Oct. 26, 1988, now abandoned.

(51) Int. Cl.[7] ..... B41J 2/02; B41J 2/105; B41J 2/205

(52) U.S. Cl. ..... 347/15; 347/76

(58) Field of Search ..... 347/15, 74, 75, 347/76, 78, 80, 73

(56) References Cited

U.S. PATENT DOCUMENTS

| | | | | | |
|---|---|---|---|---|---|
| 3,298,030 A | * | 1/1967 | Lewis | 347/74 |
| 3,373,437 A | | 3/1968 | Sweet et al. | |
| 3,588,906 A | * | 6/1971 | Van Brimer | 347/74 X |
| 3,596,275 A | * | 7/1971 | Sweet | 347/74 |
| 3,689,693 A | * | 9/1972 | Cahill | 347/3 |
| 3,737,914 A | | 6/1973 | Hertz | |
| 3,836,912 A | * | 9/1974 | Ghoogasian | 347/80 X |
| 3,878,517 A | * | 4/1975 | Kasubuchi | 347/74 |
| 3,916,421 A | | 10/1975 | Hertz | |
| 3,928,718 A | * | 12/1975 | Sagae et al. | 178/6.6 R X |
| 3,947,851 A | | 3/1976 | Chen et al. | |

(List continued on next page.)

FOREIGN PATENT DOCUMENTS

| | | | | |
|---|---|---|---|---|
| DE | 2520702 | * | 1/1976 | |
| DE | 2723037 | * | 12/1977 | |
| GB | 1532686 | * | 11/1978 | B41J/3/04 |
| JP | 54-21095 | | 7/1979 | B41J/3/04 |
| JP | 55-113580 | | 9/1980 | B41J/3/04 |
| JP | 55-124664 | | 9/1980 | B41J/3/04 |
| JP | 61-83046 | | 4/1986 | B41J/3/04 |

OTHER PUBLICATIONS

Hermanrud, B., et al; "Ink Jet Development at the Lund Institute of Technology". *Journal of Applied Photographic Enginering*, vol. 5, No. 4, Fall 1979, pp. 220–225.*

Jarvis, J.F., et al.; "A Survey of Techniques for the Display of Continuous Tone Pictures on Bilevel Displays"; *Computer Graphics and Image Processing*, vol. 5 (1976), pp. 13–40.*

*Primary Examiner*—Craig A. Hallacher
(74) *Attorney, Agent, or Firm*—McDermott, Will & Emery

(57) ABSTRACT

Method and apparatus for making high resolution color prints using ink jet techniques. The method and apparatus of providing for precise control of the number of droplets of printing fluid which is deposited in a pixel on recording paper. The precise control is achieved by incremental control of the print pulse width or time duration. Further precision can be obtained by synchronizing droplet formation with for example, the leading edge of the print pulse. The number of droplets charged during the time duration of the print pulse are the number of droplets which impinge on the paper and at the pixel location. The number of droplets creates therefore a color density. Use of a plurality of nozzles and ink colors will permit the production of very high resolution and high quality color prints.

29 Claims, 5 Drawing Sheets

U.S. PATENT DOCUMENTS

| | | | | | |
|---|---|---|---|---|---|
| 3,977,007 | A | * | 8/1976 | Berry et al. | |
| 4,087,825 | A | | 5/1978 | Chen et al. | |
| 4,178,597 | A | * | 12/1979 | Isayama et al. | 346/75 |
| 4,297,712 | A | * | 10/1981 | Lammers et al. | 346/75 |
| 4,312,005 | A | * | 1/1982 | Iwaski | 347/15 |
| 4,314,259 | A | * | 2/1982 | Cairns et al. | 346/75 |
| 4,321,607 | A | | 3/1982 | Heibein et al. | 347/79 |
| 4,326,204 | A | * | 4/1982 | Erin | 347/76 |
| 4,395,716 | A | | 7/1983 | Crean et al. | 347/41 |
| 4,412,226 | A | * | 10/1983 | Yoshida | 346/1.1 |
| 4,503,444 | A | | 3/1985 | Tacklind | |
| 4,513,299 | A | | 4/1985 | Lee et al. | |
| 4,673,951 | A | | 6/1987 | Mutoh et al. | 347/15 |

* cited by examiner

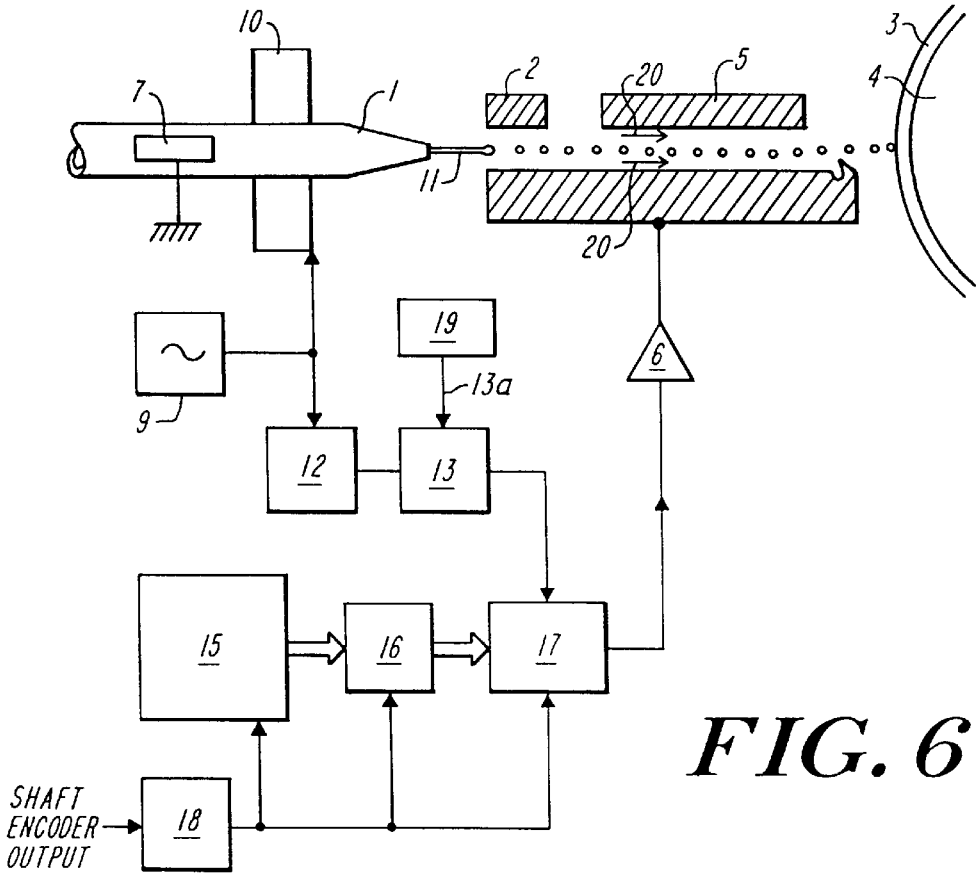
FIG. 6
FIG. 7
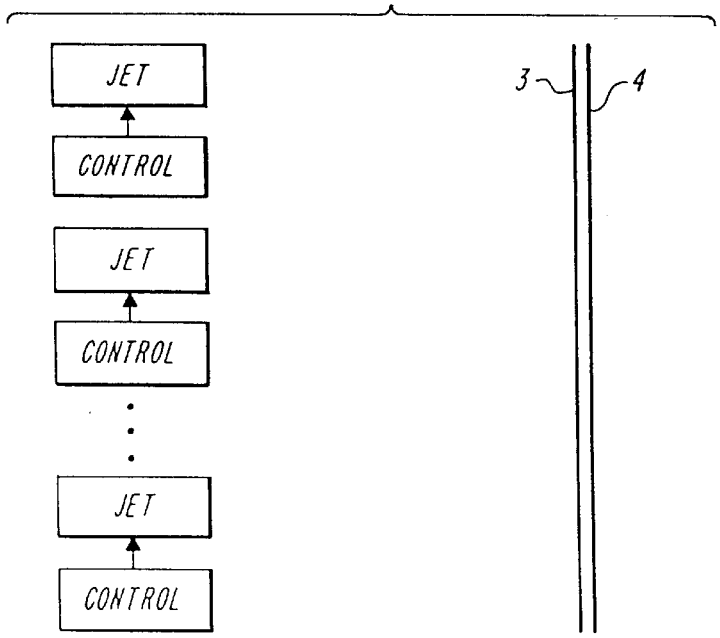

METHOD AND APPARATUS FOR HIGH RESOLUTION INK JET PRINTING

Matter enclosed in heavy brackets [ ] appears in the original patent but forms no part of this reissue specification; matter printed in italics indicates the additions made by reissue.

*This application is a continuation application of Reissue Application Ser. No. 08/117,333 filed Sep. 3, 1993, now abandoned, which in turn is a continuation application of Reissue Application Ser. No. 07/564,696 filed Aug. 7, 1990, now abandoned, which in turn is a continuation application of Reissue Application Ser. No. 07/262,916, filed Oct. 26, 1988, now abandoned, all being related to the reissue of U.S. Pat. No. 4,620,196 issued Oct. 28, 1986 from Application Ser. No. 06/696,690 filed Jan. 1, 1985.*

BACKGROUND OF THE INVENTION

This invention generally relates to methods and apparatus for ink jet printing and plotting but more particularly this invention relates to the field of high resolution ink jet color printing and plotting.

During the last decade the use of electrically controllable ink jets in recording devices such as industrial markers, printers, and color hardcopy output devices for computers, has increased measurably. Two principally different methods have been developed: drop on demand methods and methods using continuous ink jets. Both methods have been used for the printing of alphanumeric characters and to generate computer generated charts and images, often generated in color. Also ink jets have been applied in the field of facsimile transmission.

As a result of intensive research on methods for ink jet printing, the quality of the print out has been improved appreciably during the last few years. The fact of improved quality of print out is especially true for computer controlled ink jet plotters generating color pictures on paper or transparencies, where the ultimate goal is to have an image quality essentially equal to the image quality of a good photographic color print. However, the effort toward achieving this ultimate goal is limited due to the fact that the drop-on-demand method and most of the continuous jet methods are essentially digital devices, i.e., in each picture element (pixel) of the picture they place a drop of ink or no ink at all.

These plotters usually use only four colors of ink (magenta, yellow, cyan, and black). Consequently only a very limited range of color shades can be printed by different combinations of these colors in each pixel. This limitation has been circumvented by the so called dither techniques described by Jarvis, Judice and Ninke in "Computer Graphics and Image Processing", No. 5, 1976, pp 13–40. In the Jarvis, et al article, the picture is divided into a large number of square matrices, each matrix containing a certain number of pixels. A typical matrix size is 4×4 or 8×8 pixels, i.e., 4 pixels in each row and 4 pixels in each column. Thus each pixel has an area of 1/16 the area of the matrix. Different shades of color can be obtained by filling different numbers of pixels in each matrix with ink. Hence, using a 4×4 matrix 16 different shades of color and white (no color) can be generated, while an 8×8 matrix allows the rendition of 64 shades of color in addition to white. There has been described several ways of generating color shades by the matrix method above, e.g. ordered dither, digital half tone, and special unordered dither algorithms. However, due to the relatively large size of the ink drops, all of these methods result in coarse images, images so coarse that the eye can clearly discern the repetitive pattern of the matrices or at the least, the eye perceives a strong and very apparent graininess in the generated color print.

The image quality of the matrix method can be improved appreciably if the color density in each pixel can be varied continuously. If the pixels which make up the matrix are smaller than 0.1×0.1 millimeters, then the unaided human eye can no longer resolve the pixels at a normal viewing distance of 20 centimeters. Therefore, an image made up by 8 to 10 of such continuous density pixels to the millimeter has the same appearance, when viewed by the unaided eye, as a truly continuous tone picture, typified by a high grade photographic color print. The fact, of pixels smaller than 0.1×0.1 mm appearing as continuous, is used in conventional high quality color printing using offset or gravure plates, where pixel densities of 6 to 8 pixels per millimeter (160 to 200 per inch) are used and these methods generate color shades by varying the size of each pixel point, i.e., the amount of ink applied to each pixel.

The primary object of the present invention is to essentially apply the method used in offset and gravure printing to ink jet printing resulting in dramatic improvements in image quality and resolution of ink jet color prints.

SUMMARY OF THE INVENTION

The central idea of the invention is to control the amount of ink laid down in each pixel by the ink jet. This control of the ink can be attained by using continuous ink jets modulated electrically as described by Hertz in the U.S. Pat. No. 3,916,421. Depending on an electrical signal voltage applied between the ink and a control electrode surrounding the point of drop formation, the drops generated by the continuous jet are either charged or uncharged. When these drops subsequently travel through an electric field, the charged drops are deflected into a catcher while the uncharged drops travel undeflected onto the recording paper.

Now, if the jet diameter is small, e.g., about 10 $\mu$m and its velocity is about 40 meters per second, the drops are so small that the mark produced by a single ink drop on the paper cannot be detected by the unaided eye. Therefore, in order to print a pixel in the matrix color method described above, about 30 drops of ink have to be deposited in each pixel. This is achieved by keeping the electrical control signal at 0 volts during the generation of 30 drops, so that their electrical charge is zero which allows them to travel to the paper undeflected. Throughout the remaining portion of this disclosure this electric signal may be called the print pulse. Obviously, if the number of drops generated per second is constant, the length of time duration $t_p$ of the print pulse will determine the number of drops in the form of a drop train, travelling towards the paper.

If, e.g., 30 drops of ink are required to generate maximum color density in a pixel, lighter shades of that color can be produced by laying down a smaller number of drops in that pixel. Actually, if it can be assumed that one could determine exactly the number of drops laid down in the pixel by controlling the length of the electrical print pulse, then in this way 30 shades of a color in addition to white (no color) could be generated in each pixel. By the above method then, the color saturation in each pixel can be varied essentially continuously as in the case of conventional offset of gravure printing.

While the principle of the present invention appears to be and in fact is relatively simple, it is actually very difficult to put into practice. Firstly, the diameter of the drops has to be very small and the drop generation rate must be relatively high and essentially constant. Secondly, because of the high air resistance encountered by the very small drops, not only the individual drops but also groups of drops tend to merge on their way to the paper which gives rise to an appreciable graininess especially in the instances of lighter shades of a color. Finally, drops with undefined charges should be avoided for the same reason, that is, merging will take place as noted above.

It is therefore an object of the present invention to control the number of drops deposited in each pixel. According to the invention this objective can be achieved by realizing at least one or more of the following features or combinations of any or all of the following functions or features:

a. the jet diameter should be small its velocity high to ensure a high drop generation rate;

b. ultrasonic stimulation of the drop formation process of the jet should be used to insure a high and constant drop generation rate and to decrease the drop diameter and also providing for or causing the generation of all drops having diameters which are essentially equal to each other, thereby decreasing the tendency for the drops to merge because equal size drops will encounter equal air resistance resulting in essentially equal transit time from nozzle to paper;

c. providing for slightly charging the drops, which are meant to reach the paper, which like charges thereby causing a repulsive force between them which further counteracts the merging tendency of the drops or of the groups of drops;

d. obviously the length of the electrical print pulse determining the number of drops that reach the recording medium, generally paper, can vary continuously. This also tends to cause graininess of the image, which can be avoided by the use of suitable electronic circuitry which adjusts the length of the signal such that it equals n/f, where f is the drop formation frequency and n an integer chosen such that the ratio n/f is close to the length of the original signal and additionally, the start of the print pulse can be synchronized with a suitable phase of the ultrasonic stimulation mentioned under b;

e. providing for an air flow directed along the axis of the jet from the nozzle towards the recording paper to decrease or essentially eliminate the air resistance encountered by the drops; and f. evacuating, at least partially, the space close to the jet also decreases the air resistance and further decreases the graininess of the picture.

Many other advantages, features, and additional objects of the present invention will become manifest to those versed in the art upon making reference to the detailed description and the accompanying sheet of drawings in which a preferred embodiment incorporating the principles of the present invention is shown by way of illustrative example.

BRIEF DESCRIPTION OF THE DRAWINGS

FIG. 6 shows a block diagram of another embodiment of the invention.

*FIG. 7 shows another embodiment of the invention.*

DETAILED DESCRIPTION OF THE INVENTION

Figure 1:
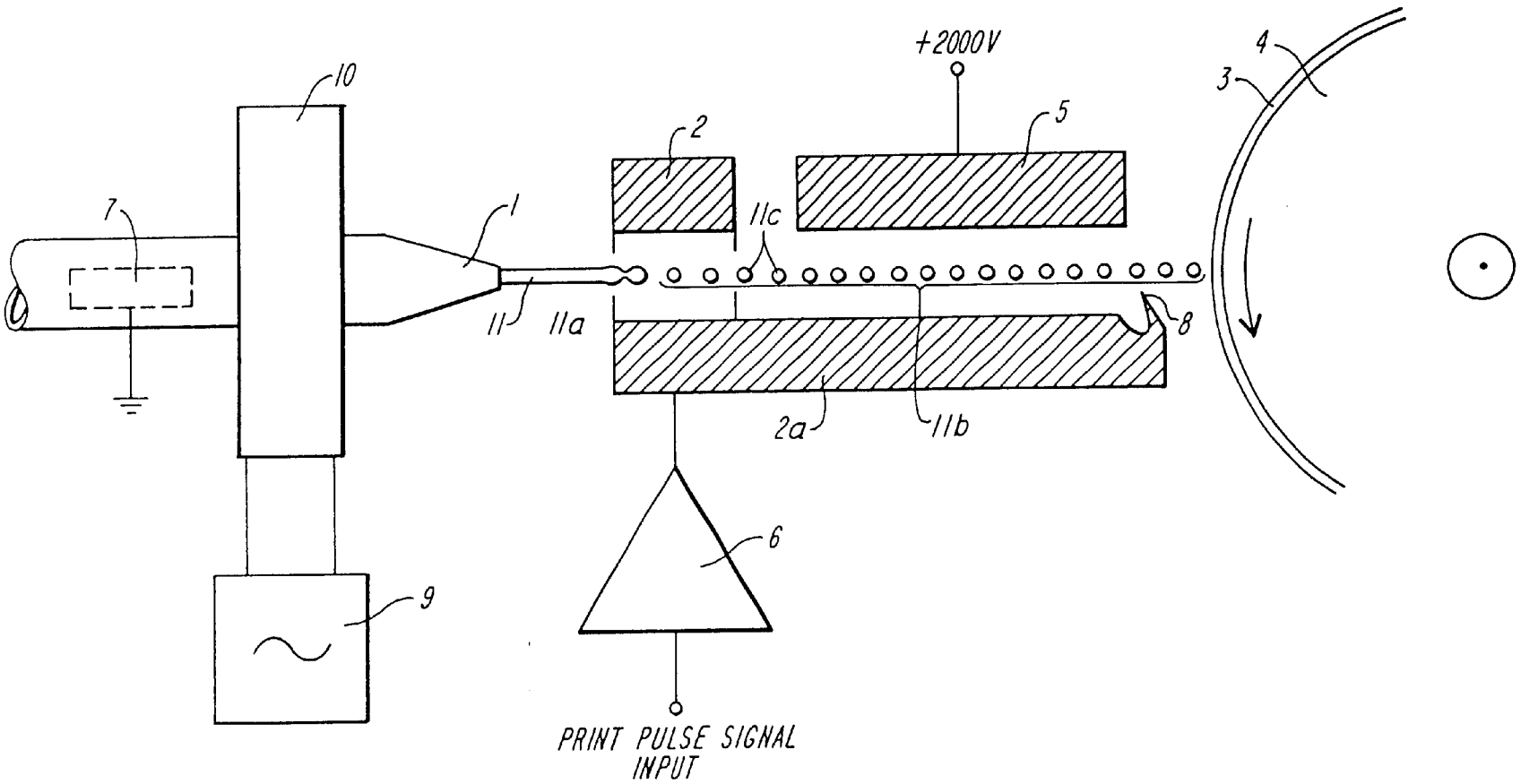
FIG. 1 shows the side view of an electrode system that can be used in conjunction with the invention.

The methods and apparatus of this invention can be accomplished using electrode systems very different from these systems conventionally used to control the continuous jet as used in drum plotters and as described by Hermanrud & Hertz in Journal of Appl. Photogr. Eng. 5 No. 4 (1979). However, for the sake of simplicity an electrode system used with a single jet, and as shown in FIG. 1 and described in U.S. Pat. No. 3,916,421, included herein by reference thereto, will be used when explaining the invention. Here an ink jet 11 issues under high pressure from the nozzle 1 and breaks up into a train of drops 11b at the point of drop formation 11a inside the control electrode 2. This train of normally uncharged drops 11b travels in a line or along an initial axis towards the recording medium or paper 3 which is mounted on or otherwise affixed to a rotating drum 4 of a drum plotter (not shown). On the way from nozzle 1 toward paper 3, the drops 11b pass a transverse electric field generated between the positively charged high voltage electrode 5 and the lower part 2a of the control electrode 2.

Now, if a positive control voltage is applied to the control electrode 2 via an amplifier 6 while the ink is grounded via the electrode 7, an electric field is established at the point of drop formation causing each of the drops 11c formed at the point of drop formation 11a to be positively charged. Because of the charge, these drops 11c are deflected into the catcher 8 and cannot reach the recording paper 3. When the control voltage is decreased from such a positive level so as to cause all the drops 11c to fall into catcher 8 a lesser positive voltage level is reached which will permit the drops 11c to reach the paper 3. Thus, it is obvious and apparent from FIG. 1 that the length of time during which the signal voltage or print pulse applied to electrode 2 is zero, or less than the point cut off control voltage, determines the number of drops 11c that reach the recording paper 3, i.e., the drops 11c formed during that period of lesser positive voltage are not charged or are not sufficiently charged, as a result of the charge on the droplet directing electrode 5, so that they get deflected into catcher 8.

In an actual embodiment of the invention an ink jet 11 having a diameter of 10 $\mu$m and a velocity of 40 meters per second is used. Such a jet will form into approximately $10^6$ drops 11c per second at the point of drop formation 11a. If the drum 4 of the drum plotter rotates with a surface velocity of 3.3 meters per second and the size of a pixel (picture element) is assumed to be 0.1×0.1 millimeters, the time required in order to print a pixel is about 30 microseconds. Since 30 drops are formed during the 30 microsecond interval of time, all of these 30 drops will be deposited within a certain pixel if the control voltage supplied to the control electrode 2 was zero or less than the print cut-off voltage during the 30 microseconds. Thus a maximum color density will be generated in the pixel. If the print pulse duration is shorter than 30 microseconds, less than 30 drops will be deposited in the pixel, and thus the actual number of drops and therefore the color density of the pixel will depend on the duration i.e., the length of the print pulse or control voltage. Thus by controlling the length of the print pulses the density or saturation of the color can be controlled in each pixel of the picture generated on the recording paper 3. Since a plurality, typically 3 or 4 or more jets 1 having different colors can be arranged side by side on the drum plotter apparatus as described by Hermanrud and Hertz in Journal of Appl. Photogr. Eng. 5 No. 4 (1979), full color pictures can be generated where the hue and color density can be varied continuously in each pixel.

While the principle of the invention, i.e., varying the color density in each pixel by controlling the number of drops deposited in each pixel, is simple, its realization meets with many difficulties. First, the drop generation rate has to be as large as possible to provide for the generation of a nearly continuous variation of the color density. A high drop generation rate can be attained by using a small nozzle 1, thus producing a high speed jet 11. For letter sized pictures the nozzle size should be about 10 $\mu$m and the speed of the jet 11 should be about 40 meters per second. Further, by stimulating the drop formation process by applying ultrasonic vibrations generated by the oscillator 9 and the transducer 10 to the nozzle 1, as exemplified in FIG. 1, the number of drops formed per second can be increased. A further consequence of the ultrasonic vibrations is that the size of each drop 11c usually becomes relatively constant resulting in a decrease in the deleterious effects of air resistance such as drop merger. In the 10 $\mu$m jet described above ultrasonic frequencies between 1 and 1.5 MHz (megahertz) will create $10^6$ to $1.5\times10^6$ drops per second. Therefore, it is an advantage to stimulate the jet 11 by ultrasonic vibrations.

One of the difficulties encountered in attempting to create exactly the same color density in each pixel is created by the tendency for drops 11c to merge, or groups of drops to merge due to air resistance encountered on the flight from the point of drop formation 11a toward the recording paper 3. Such merging results in slight misplacement of the drops on the recording paper 3 since the paper is traveling at a near constant rate while the drops 11c would arrive at the paper 3 at an irregular rate. This slight misplacement results in a certain amount of graininess, especially in the lighter shades of a color.

Figure 2:
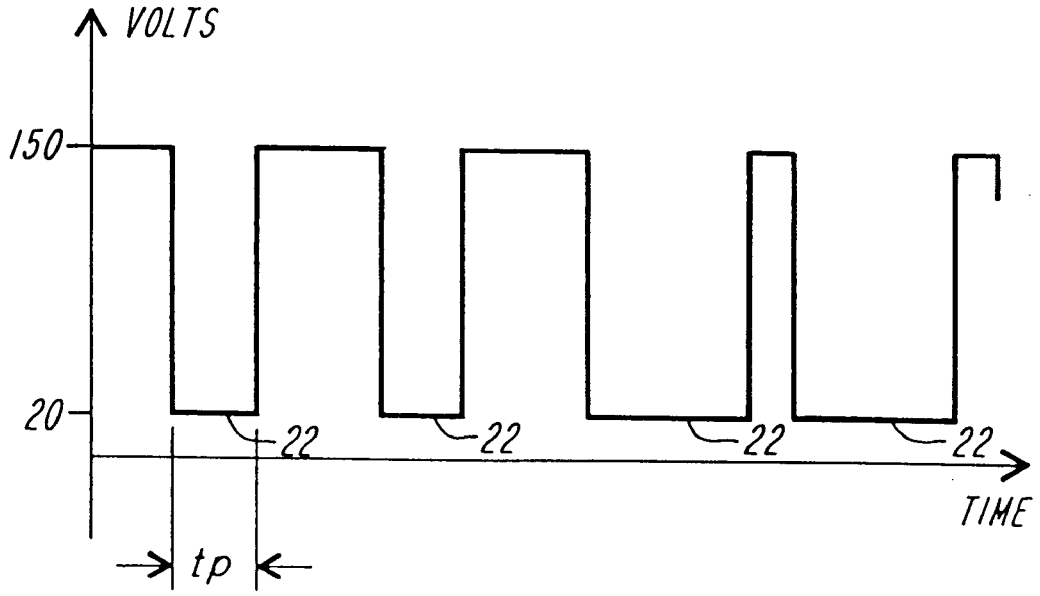
FIG. 2 shows the time dependence of the electrical signal used for the controlling of the ink jet.
Figure 3:
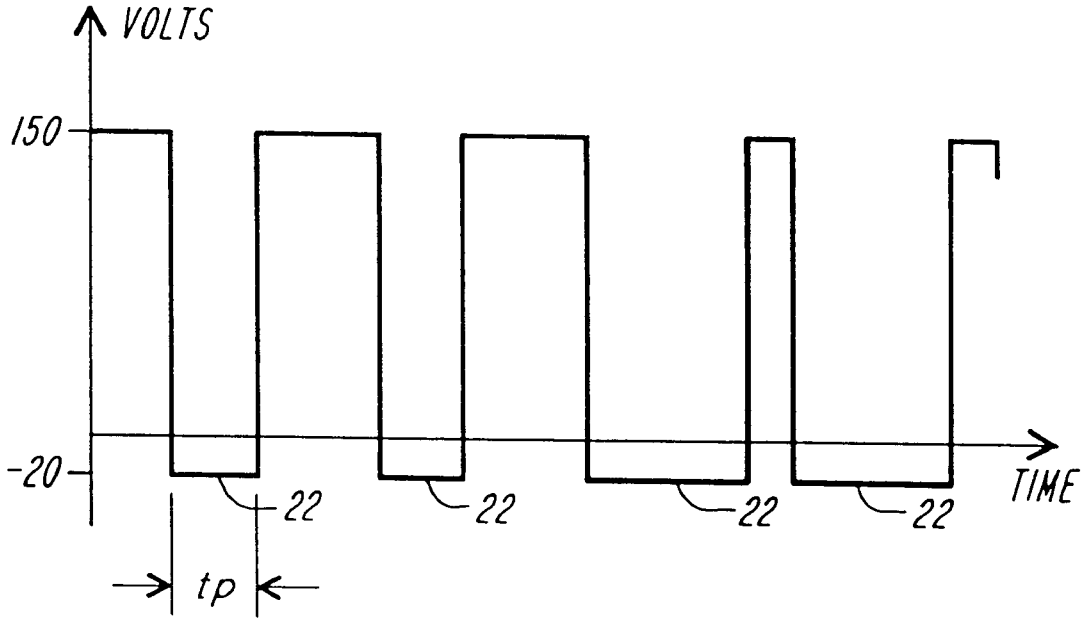
FIG. 3 is similar to FIG. 2 except that the voltage varies from −20 to 150 volts rather than from 30 20 to +150 volts.

The merging of the drops can be partially counteracted by using a voltage slightly different from zero for the print pulses 20 and 22 as shown in FIGS. 2 and 3. In FIG. 2 the voltage applied to the control electrode 2 is switched between +20 and +150 volts and the number of droplets 11c which will impinge on the paper 3 is directly related to the width of the pulses. If the voltage is a positive 150 volts, the drops 11c are strongly charged positively and essentially all of the drops 11c are therefore deflected into the catcher 8. If, however, during the voltage of the print pulses 20 (the negatively directed portion of the control signal) is only 20 volts the drops 11c are only slightly charged and their deflection in the transverse electrical field created by the [positive] 2000 volts applied to the high voltage electrode, droplet directing electrode 5 is so small that they pass above the catcher blade 8 onto the recording paper 3. As a result of the relatively small [positive] charge, the drops 11c repel each other, thereby decreasing the tendency toward drop merging. Alternatively, essentially the same results are achieved where the print pulse 22 voltage might be −20 volts and the "off" voltage or the print cut-off control voltage is +150 volts as shown in FIG. 3. It should be clear to those skilled in the art that the voltages given here are only examples of useable voltage levels and the voltages can vary within wide limits. Additionally, the same effect can be achieved by applying a DC offset voltage of e.g. +20 volts to the electrode 7 and use a control signal varying from, for example, zero volts to a positive 150 volts at the control electrode 2. The control signal also might be applied to the electrode 7 as described in U.S. Pat. No. 3,737,914.

It has been pointed out above that irregularities in the drop placement give rise to graininess of the picture. Such graininess is also caused if the number of drops deposited in each pixel varies stochastically in an area of constant color density. This is especially true in the lighter shades of color, which are created by 1 to 5 drops per pixel only. If the length of, or time duration of the print pulse can vary continuously, as compared to incrementally, and/or the pulse 20 or 22 is not synchronized or timed with the drop formation process of the jet 11, then it is obvious that (especially at low drop numbers) variations in the number of drops per pixel for a particular pulse duration may occur, a situation which is aggravated by so-called "historic effects" encountered during the charging of the drops 11c. This problem can be avoided in several ways, two of which are described below.

Figure 4:
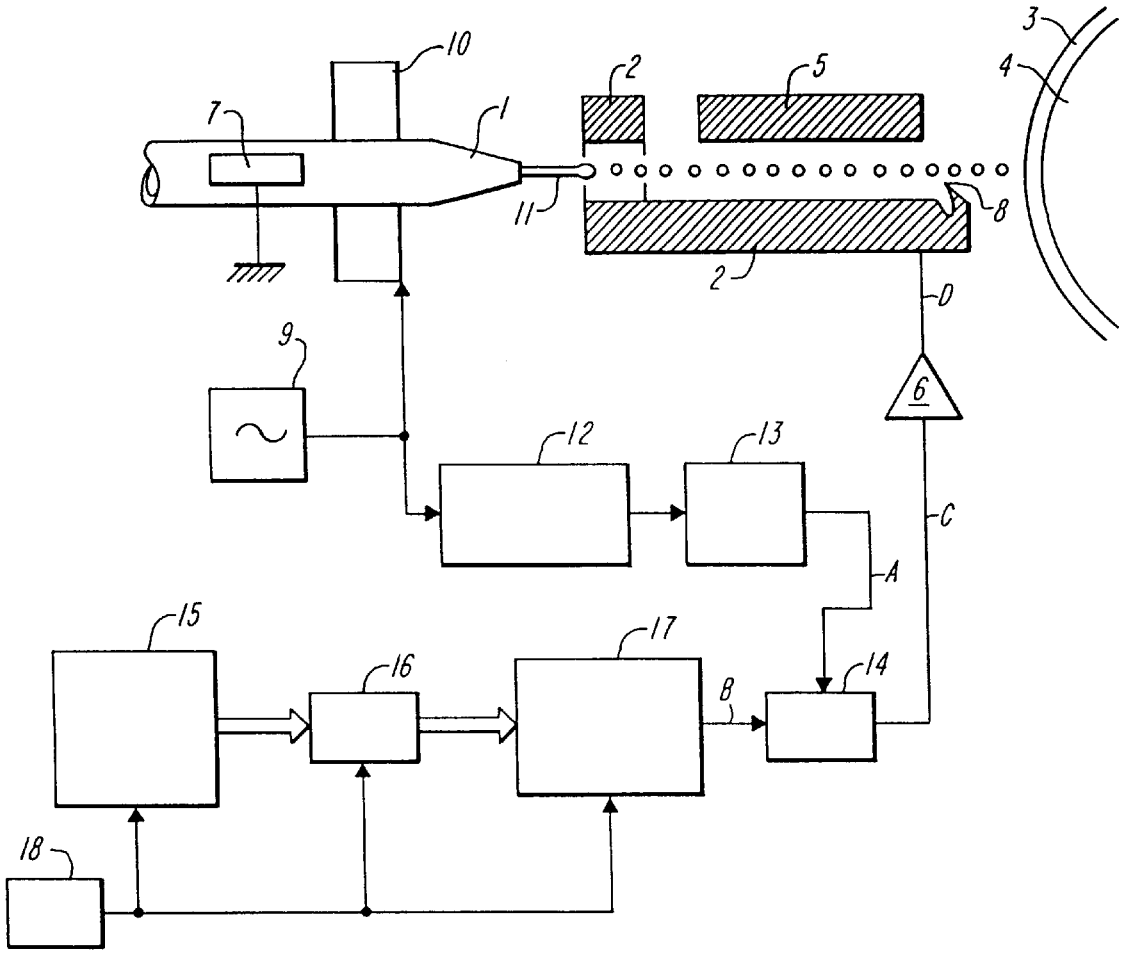
FIG. 4 shows a block diagram of an electrical circuit used to realize one embodiment of the invention.
Figure 5:
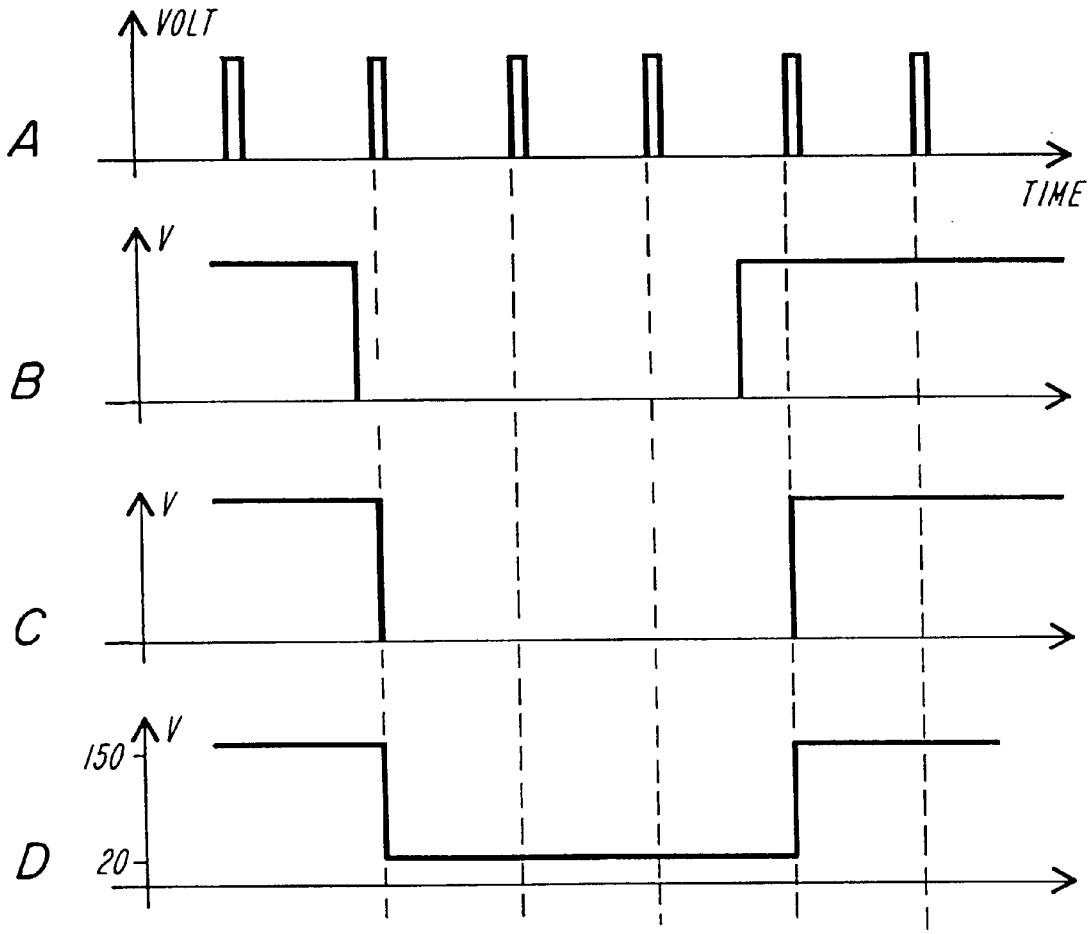
FIG. 5 is used to illustrate the transformation of the print pulse.

In an area of constant color density all print pulses 20 or 22 controlling the number of drops deposited in each pixel will necessarily have essentially the same length or duration. As pointed out above, unless there is synchronism between the print pulse and the drop formation, a constant duration print pulse does not prevent certain stochastic variations in the number of drops deposited in each pixel. That is, exactly the same number of droplets 11c will not necessarily be deposited. However, this variation can be avoided if the time duration $t_p$ of the print pulse 20 or 22 can be varied only in discrete steps so that $t_p$=n/f, where n is an integer number equal to the number of drops to be deposited in the pixel and f the drop formation frequency given in drops per second generated by the combination of nozzle 1 and oscillator 9. That is, the print pulse width does not vary continuously but in incremental steps having a time width increment related to [n/f.] *1/f.* FIG. 4 illustrates a block diagram of an electrical circuit which in effect controls the incremental width of the pulses. For further clarification FIG. 5 shows a timing diagram of some of the pulses occurring in FIG. 4. Particularly pulses A, B, C and D which would be measured at the indicated location in FIG. 4.

In FIG. 4 the nozzle 1 producing the jet 11 as well as the electrode system 2 and 5 are illustrated. The signal from the oscillator 9 driving the transducer 10 is applied to a monostable multivibrator 12 which produces one short duration pulse for each oscillation of the signal. After an adjustable delay circuit 13, these pulses are applied to a sample-and-hold circuit 14. These pulses are the pulses marked as A and are shown in the timing diagram of FIG. 5.

In most cases the information determining the color density in each pixel is stored in digital form in a memory 15. Each time a pixel is to be printed the corresponding digital value is extracted from this memory and applied to a digital-to-pulse-width or duration converter 17 via another sample-and-hold circuit 16. This transformation of a digital number from the memory 15 to a pulse having a duration $t_p$ proportional to this number is governed by a clock 18 which, in the case of a drum plotter, is derived from the shaft encoder pulses. Thus, for each pixel a print pulse is presented at the output of the digital-to-pulse-width converter 17 as shown in the timing diagram B of FIG. 5.

As shown in FIG. 4 the output pulse B is applied to the sample-and-hold circuit 14. Since the sampling is initiated by the pulses A derived from the transducer driver signal, the width of the output pulse C from the sample and hold circuit 14 is always an integer number of the period of the driver signal. In other words, if f is the frequency of the driver signal, the pulse width (or duration) is equal to n/f, n being an integer and being eqaul to the number of drops per pixel as indicated in the timing diagram D of FIG. 5. In an area of constant color density n is constant wherefore exactly the same number of drops is deposited in each pixel. This process essentially eliminates or at least materially reduces the amount of graininess in the area if merging of drops due to air resistance is prevented at the same time, i.e., the drops 11c have a small positive or negative charge sufficient to minimize the tendency to merge.

The graininess due to stochastic variations in the drop number per pixel can be further reduced by synchronizing the start of, i.e., the leading edge of, the print pulse with a suitable phase of the drop formation mechanism. This synchronization can be achieved, e.g., by a circuit shown in FIG. 6. As was the case in FIG. 4, the memory 15 acts as a data source which forwards the digital value of the density of each pixel via a sample-and-hold circuit 16 to the digital-to-pulse-width converter 17. Again this information flow is governed by a clock 18 derived e.g. from a shaft encoder. However, the start of each digital-to-pulse-width conversion cycle is here synchronized to the driver signal generated by the oscillator 9. Such synchronization is controlled by the short pulses A generated by the monostable multivibrator 12. These monostable or synchronizing pulses are suitably delayed in the adjustable delay circuit 13. If necessary this delay can be automatically adjusted at location 13a of FIG. 6 by suitable electronic means *19* sensing the drop formation process. After this delay the synchronizing pulses are used to start the digital-to-pulse-width conversion cycle. This will insure that the start of the print pulse always coincides with the same phase of the drop formation process. Precise synchronizations of an electric control signal to the drop formation process are difficult, especially with small jets. Thus, the synchronizing method is a bit more difficult to carry out.

By the methods and apparatus described above the number of ink drops and thus the color density in each pixel can be very accurately, if not exactly controlled. However, if the number of drops available per pixel is relatively small i.e., N=30 as was described, then only N+1 discrete steps or variations of color density can be generated. If N is small, e.g. 30, this rather limited number of density steps easily causes contouring in the picture, especially in the lower density range of color.

To avoid this effect the number of density steps has to be increased. Obviously, this can be achieved by increasing the drop number per pixel, which will require jets of very small diameter and high speeds, e.g., 3 $\mu$m and 50–100 meters per second. However, such jets are hard to produce reliably wherefore an alternate method to increase the number of density steps will be described below.

Assume that the maximum number of drops that can be laid down in a pixel is N. Then, by changing the duration $t_p$ of the print pulse the number of drops n actually deposited can be varied between O and N, n and N being integers. The N+1 steps of density can be created in each pixel, i.e., if N=30, then shades of color and white (no color) can be generated.

The number of density steps can be increased to 2N+1 by using the fact that the pixels are very small. Assume there are two adjacent color densities, one generated by n drops per pixel and the other one by n+1 drops per pixel. A new color density can be created between these two density steps by laying down alternatingly n or n+1 drops on successive pixels in the print direction. This can easily be realized by a suitable design of the digital-to-pulse-width converter 17 in FIGS. 4 and 6.

This method of increasing the number of density steps above the maximum drop number N can be extended by including more than 2 pixel in the repetitive pattern in the print direction. As an example, let us examine the case where three adjacent pixels can receive n or n+1 drops. Then two intermediate density steps can be created between the density steps n and n+1 by depositing n, n, n+1, or n, n+1, n+1 drops in the three consecutive pixels respectively. Obviously, this scheme can be extended to 4, 5, or more adjacent pixel positions along the print direction. Also it should be emphasized that this method of increasing the number of density steps is especially important if n=0 or 1, i.e., in the very light shades of a color.

In the description given above the importance of avoiding the merger of drops 11c or groups of drops on their flight towards the recording paper 3 has been pointed out. Since this merging is due to air friction, it is obvious that this effect can be avoided by evacuating, at least partially, the space close to the jet axis or the entire plotting apparatus. Alternatively, *as illustrated by arrows 20 in FIG. 6* an air flow having about the same velocity as the jet velocity could be generated close to the jet axis following the jet 11 from the nozzle 1 to the recording paper 3 in FIG. 1, which would also tend to eliminate or substantially reduce the effect of air resistance.

It is obvious that the invention described above can be applied to different electrode systems controlling one or a plurality of ink jets in one or several colors *as generally illustrated in FIG. 7*. Also it can be used with other ink jet control mechanisms, e.g., drop on demand or thermal ink jets (bubble jets). It can be used for a single or full color image printing by either drum, flat bed or other plotters on any kind of record receiving surface. Further, its use is not limited to the production of pictures and the detailed description of the invention given above is to be regarded as an example only. Having described this invention, it will be apparent to those skilled in the art that various modifications may be made hereto without departing from the spirit and scope of this invention as defined in the appended claims.

What is claimed is:

[1. In an improved ink jet apparatus, for depositing an amount of a printing fluid of at least one color onto a pixel, said pixel being in a predetermined position on a recording medium;

droplet formation means to form droplets of said fluid said droplets being formed at a drop formation point, said droplet formation means comprising at least one nozzle means to create at least one liquid jet of fluid;

at least one means for charging said droplets substantially at said drop formation point with a predetermined and appropriate voltage level sufficient to reduce droplet merging;

means to control the location of said drop formation point;

a droplet interceptor means comprising at least one droplet directing electrode means and a droplet catcher means, said droplet directing electrode means used for applying a charge of sufficient magnitude to cause those droplets to be intercepted to be deflected into said droplet catcher means;

at least one vibrator means driven by a signal of predetermined amplitude and frequency and disposed relative to said at least one nozzle means to generate substantially uniform sized and uniformly spaced droplets, and amplitude also influencing said drop formation point location;

said improvement comprising in combination:

means for controlling said deposited amount of printing fluid by controlling the number of said droplets, said number being a predetermined number of said droplets, said predetermined number of droplets dependent upon at least one color density to be recorded and controllably deposited within said pixel whereby each such pixel having said predetermined number of droplets therein contributes toward the creation of a specific density of printing fluid.]

[2. The improved apparatus according to claim 1 wherein said means for controlling is an electrical print pulse having an appropriate predetermined voltage level and a time duration thereby causing said predetermined number of said droplets to impinge on said recording medium.]

[3. The improved apparatus according to claim 2 wherein said appropriate predetermined voltage level is zero.]

[4. The improved apparatus according to claim 2 wherein said appropriate predetermined voltage level is about +20 volts.]

[5. The improved apparatus according to claim 2 wherein said appropriate predetermined voltage level is about −20 volts.]

[6. The improved apparatus according to claim 2 further comprising means to synchronize said print pulse with the mechanical vibrations generated by said at least one vibrator means.]

[7. The improved apparatus according to claim 6 further comprising means to vary by increments said print pulse time duration where said time duration increments are in direct relation to the number of said droplets required to create a particular color density and in inverse relation to a drop formation rate.]

[8. The improved apparatus according to claim 1 further comprising a means for creating an air flow in a direction of travel of said droplets from said nozzle to said recording medium.]

[9. The improved apparatus according to claim 1 further comprising a means for at least partially evacuating a volume of space surrounding said liquid jet of fluid and said droplets formed therefrom at least from said drop formation point to a location proximate to said predetermined pixel position on said recording medium.]

[10. In an improved method for depositing an amount of a printing fluid of at least one color onto a pixel said pixel being in a predetermined position on a recording medium;

forming droplets of said fluid at a drop formation point using a droplet formation means comprising at least one nozzle means to create at least one liquid jet of fluid;

charging using at least one droplet charging means said droplets substantially at said drop formation point with a predetermined and appropriate voltage level sufficient to reduce droplet merging;

controlling a location of said drop formation point;

intercepting droplets not being deposited onto said pixel using a droplett interceptor means said interceptor means comprising at least one droplet directing electrode means and a droplet catcher means, said droplet directing electrode means used for applying a charge of sufficient magnitude to cause those droplets to be intercepted to be deflected into said droplet catcher means;

vibrating said droplet formation means using a vibrator means driven by a signal of predetermined amplitude and frequency and disposed relative to said at least one nozzle means to generate substantially uniformly sized and uniformly spaced droplets said amplitude also influencing said drop formation point location;

said improvement comprising in combination:

controlling said deposited amount of printing fluid by controlling the number of said droplets, said number being a predetermined number of said droplets, said predetermined number of droplets dependent upon at least one color density to be recorded and controllably deposited within said pixel whereby each such pixel having said predetermined number of droplets therein contributes toward the creation of a specific density of printing fluid.]

[11. The improved method according to claim 10 wherein said controlling is by applying an electrical print pulse having an appropriate and predetermined voltage level and a predetermined time duration to said at least one droplet charging means.]

[12. The improved method according to claim 11 wherein said appropriate and predetermined voltage level is zero.]

[13. The improved method according to claim 11 wherein said appropriate and predetermined voltage level is about +20 volts.]

[14. The improved method according to claim 11 wherein said appropriate and predetermined voltage level is about −20 volts.]

[15. The improved method according to claim 11 further comprising the step of synchronizing by electronic means said print pulse with the mechanical vibrations generated by said at least one vibrator means.]

[16. The improved method according to claim 15 further comprising the step of varying by increments said print pulse time duration where said time duration increments are in direct relation to the number of said droplets required to create a particular color density and in the inverse relation to a drop formation rate.]

[17. The improved method according to claim 10 further comprising the step of producing an air flow in a direction of travel of said droplets from said nozzle to said recording medium.]

[18. The improved method according to claim 10 further comprising the step of at least partially evacuating the air in a space surrounding said liquid jet of fluid and said droplets formed therefrom at least from said droplet formation point to a location proximate to said predetermined pixel position on said recording medium.]

*19. An improved ink jet printing apparatus for depositing a controlled amount of a printing fluid into each of a plurality of pixel areas on a recording medium, said apparatus comprising:*

*drop formation means for forming a continuous stream of drops of said fluid from an ink jet by a repetitive drop formation process, said drop formation means including at least one nozzle for forming said stream and vibrator means, responsive to a vibration signal and disposed relative to said nozzle, for controlling said drop formation process so that said drops are formed at a drop formation point at a predetermined, substantially uniform rate "f", "f" being sufficiently large such that the variation in the possible number of drops that can be deposited in each pixel area provides for a nearly continuous variation of possible densities for each of said pixel areas, wherein said drops are of a substantially uniform size and sufficiently small so that each drop, disposed on a recording medium, is undetectable by the unaided eye at a normal viewing distance from said recording medium;*

*means for providing fluid to said nozzle;*

*charging means for selectively charging each of the drops;*

*means for generating said vibration signal;*

*signal control means, connected to said charging means, for generating (i) a deflection signal for charging said*

*drops to a first magnitude at approximately said drop formation point so as to prevent said drops from reaching said recording medium, and (ii) a print signal for charging said drops to a second magnitude sufficient to permit said drops to reach said medium;*

*drop interceptor means for intercepting said drops charged to said first magnitude so as to prevent said drops charged to said first magnitudes from reaching said recording medium;*

*means for providing relative motion between the drops of said stream charged to said second magnitude and said recording medium so that said drops can be precisely placed on said recording medium; and*

*means for depositing precisely a predetermined number of drops in a pixel by controlling and synchronizing the phase between the formation of the first of said predetermined number of drops and the start of the print signal for charging said predetermined number of drops and by controlling the duration of said print signal to be equal to an integer multiple "n" of the period "1/f" of said vibration signal where the integer multiple "n" equals the predetermined number of drops, wherein said means for depositing includes means for adjusting the phase between the formation of the first of said predetermined number of drops and the start of the print signal corresponding to said predetermined number of drops.*

*20. The apparatus according to claim 19, wherein said means for depositing further includes a digital signal to pulse duration signal converter for translating digital data into electrical pulses of different fixed durations, said durations being integer multiples "n" of the period "1/f" of said vibration signal.*

*21. The apparatus according to claim 20, wherein said means for depositing further includes means for generating a time digital signal in response to said relative motion, a source of digital data, said digital data indicative of the number of drops to be deposited in each pixel, said digital signal being operative to initiate the transfer of data associated with each pixel from said source to said converter.*

*22. The apparatus according to claim 19, wherein said means for depositing further includes means for generating a digital control signal, said digital control signal being operative to set the duration of said print signal associated with each pixel.*

*23. The apparatus according to claim 19, wherein said means for adjusting the phase between the formation of the first of said predetermined number of drops and the start of the print signal further includes an adjustable signal delay circuit responsive to a timing pulse, said timing pulse being generated by a circuit responsive to said vibration signal.*

*24. The apparatus according to claim 19, wherein said means for adjusting the phase between the formation of the first said predetermined number of drops and the start of the print signal includes electronic drop formation process sensing means for generating a phase adjustment signal, said phase adjustment signal operative to adjust the start of the print signal relative to the vibration signal of said drop of formation process.*

*25. The apparatus according to claim 19, wherein said drops are sufficiently small so that pixels of predetermined size and containing a preselected maximum number of said drops can not be resolved by the unaided human eye at a normal viewing distance.*

*26. The apparatus according to claim 25, wherein the predetermined size of said pixel is on the order of about 0.1 mm×0.1 mm.*

*27. The apparatus according to claim 25, wherein the preselected maximum number of drops is about 30 drops.*

*28. The apparatus according to claim 19, wherein the diameter of said ink jet is on the order of about 10 μm.*

*29. The apparatus according to claim 19, wherein the diameter of said ink jet is on the order of about 3 μm.*

*30. The apparatus according to claim 19, wherein said stream of drops is formed at a velocity on the order of about 40 meters per second.*

*31. The apparatus according to claim 19, wherein said stream of drops is formed at a velocity on the order of between about 50 and about 100 meters per second.*

*32. The apparatus according to claim 19, wherein said vibration signal is on the order of between about 1 MHz and about 1.5 MHz and the rate at which said drops are formed by said drop formation process is on the order of between about 1 MHz and 1.5 MHz.*

*33. The apparatus to claim 19, further including means for reducing the air resistance encountered by said stream of drops.*

*34. The apparatus to claim 33, wherein said means for reducing the air resistance includes means for evacuating, at least partially, the space through which said stream of drops travels.*

*35. The apparatus according to claim 33, wherein said means for reducing the air resistance includes means for creating air flow in the same direction of travel as said stream of drops.*

*36. The apparatus according to claim 35, wherein the velocity of said air flow is substantially the same as the velocity of said stream of drops.*

*37. The apparatus according to claim 19, wherein said drop formation means includes a plurality of nozzles for separately forming a corresponding plurality of said streams.*

*38. The apparatus according to claim 19, wherein said drop formation means includes a plurality of nozzles for separately forming a corresponding plurality of said streams of several colors.*

*39. A method of ink jet printing for controlling the number of drops from a stream of drops toward a recording medium to be deposited in successive pixel areas on a recording medium said method comprising the steps of:*

*generating said stream of drops by a drop formation process of repetitively forming said drops at a controlled frequency "f", "f" being sufficiently larger such that the variation in the possible number of drops that can be deposited in each pixel area provides for a nearly continuous variation of possible densities for each of said pixel areas, wherein the drops are of a uniform size and sufficiently small so that each drop, disposed on the recording medium is undetectable by the unaided eye;*

*selectively generating a print signal for charging selected drops in said stream to a charge level to allow them to reach said recording medium and selectively generating a deflection signal for charging selected drops in said stream to a charge level to prevent them from reaching said medium;*

*synchronizing said print signal with said drop formation process such that each print signal starts at a selected but adjustable phase relative to said drop formation process; and*

*controlling the duration of said print signal to be an integral multiple of the period of said drop formation process.*

*40. The method of claim 39, including the step of adjusting the start of said print signal relative to and in response to said drop formation process.*

*41. The method of claim 39, further including the step of providing an oscillator signal of a controlled frequency "f" for driving a crystal so that the crystal vibrates so as to control the drop formation process, generating a repetitive clock pulse indicative of a preselected phase of said oscillator signal, and selectively initiating said print signal by adjustably delaying said clock signal.*

*42. The method of claim 41, wherein said step of adjusting delaying is carried out in response to said drop formation process.*

*43. A method of ink jet printing in which variable amounts of ink are deposited on subsequent pixel areas of a recording medium, said method comprising the steps of:*

*a) generating a least one ink jet propagating in a predetermined direction toward said recording medium to a point of drop formation, said ink jet disintegrating at said point of drop formation into a train of drops of a uniform size and sufficiently small so that each drop, disposed in the recording medium is undetectable by the unaided eye at a normal viewing distance from the recording medium;*

*b) controlling the time and the rate and, thus, the period of the formation of said drops "1/f" where "f" is sufficiently large such that the variation in the possible number of drops that can be deposited in each pixel area provides for a nearly continuous variation of possible densities for each of the pixel areas;*

*c) producing relative motion between the propagating direction of said jet and said recording medium;*

*d) producing an electrical deflection field across the path of the drops between said point of drop formation and said recording medium;*

*e) selectively charging the drops forming at said point of drop formation by an electrical signal containing print pulses, the charge state which the drops obtain during each print pulse allowing the drops having this charge state to proceed through said deflection field to the corresponding pixel area of said recording medium while the drops generated when no print pulse is present obtain another charge state which in cooperation with said deflection field prevents those drops from reaching said recording medium; and*

*f) controlling the duration of each print pulse as a function of the amount of ink to be deposited on the pixel area corresponding to said print pulse,*

*wherein the duration of each print pulse is controlled in steps of an integer multiple of said drop formation period "1/f", and the time relation is synchronized between the time drops are formed during the drop formation process and the start of each print pulse.*

*44. The method as claimed in claim 43, wherein drops charged by the control signal level between said print pulses are prevented from reaching the recording medium and the print pulses comprise a small offset voltage which still allows the drops to reach the recording medium but reduces the tendency of adjacent drops to merge.*

*45. An ink jet printing apparatus comprising:*

*a) means for generating at least one ink jet propagating in a predetermined direction toward a recording medium to a point of drop formation, where said ink jet disintegrates into a train of drops of a uniform size and sufficiently small so that each drop disposed in the recording medium is undetectable by the unaided eye at a normal viewing distances from the recording medium;*

*b) means for controlling the time and the rate and, thus, the period of the formation of said drops "1/f" where "f" is sufficiently large such that the variation in the possible number of drops that can be deposited in each pixel area provides for a perceptible nearly continuous variation of possible densities for each of the pixel areas;*

*c) means for producing relative motion between said jet propagating direction and said recording medium;*

*d) means for producing an electrical deflection field across the path of the drops between said point on drop formation and said recording medium;*

*e) electrode means positioned at said point of drop formation;*

*f) circuit means for applying an electrical signal containing print pulses to said electrode means for selectively charging the drops formed at said point of drop formation, wherein said print pulses, when present, cause the drops formed by said signal to attain a first charge state which allows the drops to proceed through said deflection field to said recording medium, and when absent, cause the drops formed by said signal to attain a second charge state which in cooperation with said deflection field prevents those drops from reaching said recording medium;*

*g) means for controlling the duration of each print pulse as a function of the amount of ink to be deposited on a pixel area of said recording medium which corresponds to the respective print pulse; and*

*h) means for controlling the time relationship between the commencement of each print pulse and the time the drops are formed during said drop formation process; wherein said means for controlling the duration of each print pulse comprises circuit means controlled by the means for controlling the period of drop formation so that the duration of said print pulses is varied by integer multiples of said drop formation period "1/f" and said print pulse is synchronized with respect to the time the drops are formed during the drop formation process.*

*46. The apparatus as claimed in claim 45, further comprising means for controlling the time relationship between the commencement of each print pulse and the time the drops are formed during said drop formation process.*

*47. The apparatus as claimed in claim 46, wherein said time relationship control means comprises a delay circuit coupled between said means for controlling the drop formation process and said means for controlling the duration of said print pulses, the delay of said delay circuit being controllable by a control signal.*

* * * * *

UNITED STATES PATENT AND TRADEMARK OFFICE

CERTIFICATE OF CORRECTION

PATENT NO. : RE 37,862 E
DATED : October 1, 2002
INVENTOR(S) : Carl H. Hertz et al.

It is certified that error appears in the above-identified patent and that said Letters Patent is hereby corrected as shown below:

Column 12,
Line 41, before "toward", insert -- traveling --.

Signed and Sealed this

Eighth Day of April, 2003

JAMES E. ROGAN
*Director of the United States Patent and Trademark Office*